United States Patent [19]

Barr et al.

[11] 4,395,613
[45] Jul. 26, 1983

[54] UNIVERSAL ELECTRODE HOLDER

[75] Inventors: James L. Barr; Donald R. Johnson, both of Jamestown, N.Y.

[73] Assignee: Barr Mold & Die, Inc., Ashville, N.Y.

[21] Appl. No.: 260,087

[22] Filed: May 12, 1981

[51] Int. Cl.³ .......................... B23K 9/28; B23P 1/04
[52] U.S. Cl. ................................. 219/69 E; 219/690; 219/138; 204/297 R; 204/286
[58] Field of Search ................... 219/69 E, 138, 69 R, 219/69 D, 68, 145.1, 121 PX; 82/36 B; 29/40, 41; 269/203, 208, 156, 155, 154, 152, 82, 87; 204/297 R, 300 R, 285, 286

[56] References Cited

U.S. PATENT DOCUMENTS 3,474,215 10/1969 Johanson ...................... 204/297 R
3,600,547  8/1971 Turner .............................. 219/69 E
3,741,573  6/1973 Treer ............................... 219/69 E Primary Examiner—Roy N. Envall, Jr.
Assistant Examiner—Catherine Sigda
Attorney, Agent, or Firm—Bean, Kauffman & Bean

[57] ABSTRACT

A universal electrode holder having a holder body including a top face, a bottom face, perpendicular side- walls and end walls, wherein one side wall is stepped to define offset lower and upper surface portions joined by a horizontally disposed connecting surface portion; a reference plate having a reference surface disposed to extend transversely of the lower and connecting surface portions; an indexing plate having an indexing surface and being slidably mounted on the lower and connecting surface portions to selectively vary the distance between the reference and indexing surfaces; a clamp device fixed to the holder body for releasably clamping an electrode of rectangular cross section in a mounted position, wherein its opposite edge surfaces engage with the reference and indexing surfaces, its upper and rear side surfaces engage with the connecting and lower surface portions and its front side surface engages with the clamping device; mounting and aligning means including a plurality of ribs depending from the bottom face for alternatively mounting a plate electrode in engagement with the bottom face; and fluid passageway means defined by the holder body and alternatively by cooperation of the indexing means and lower surface means for supplying fluid to the side mounted electrode and by cooperation of the mounting and aligning means, the bottom surface and the plate electrode for supplying fluid to the latter.

22 Claims, 8 Drawing Figures

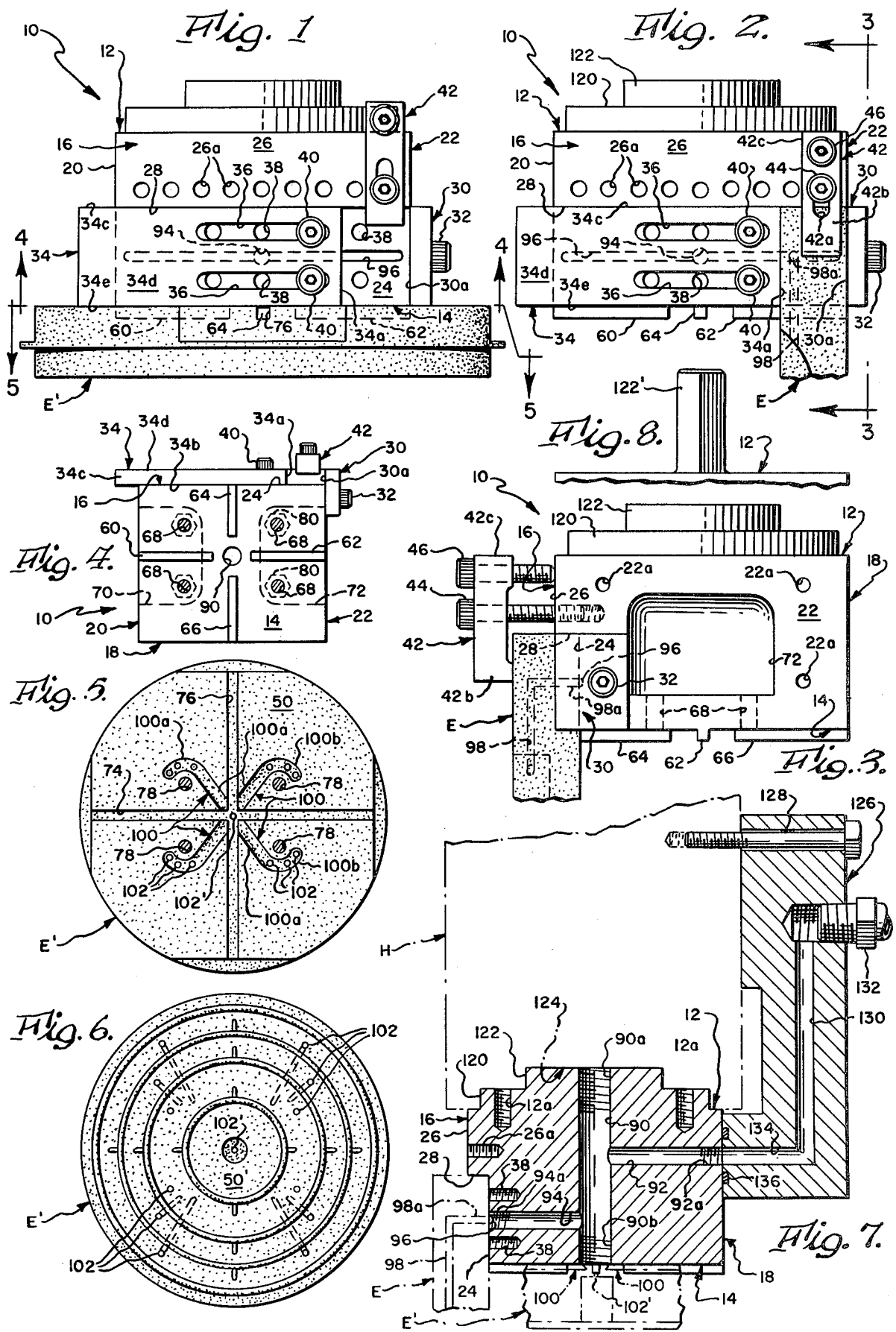

UNIVERSAL ELECTRODE HOLDER

BACKGROUND OF THE INVENTION

The present invention relates to electrode holders and, more particularly, to a universal electrode holder that may be employed in conjunction with apparatus for the removal of metal by electrical machining techniques.

Typical of such apparatus is an electrical discharge machining device (EDM), wherein a supply of dielectric fluid is delivered to the working faces of the electrodes, usually through internal passages in the electrodes. With machines of this type various sizes and shapes of electrodes are employed which, thereby compounds the task of attaching a fluid supply to such diverse electrodes. Moreover, the variation in electrode designs necessitates the use of special holders for different types. For example, a long electrode having planar side edges might require one type of holder; whereas an annular disc or plate-type electrode might require another type of holder. Oftentimes a V-shaped clamping block is employed as a holder, thereby requiring the electrodes to have shanks for gripping contact with the clamping block. This general type of holder makes precise positioning of the electrode with respect to the work stock extremely difficult (if not impossible) when the electrode has to be changed and/or replaced.

SUMMARY OF THE INVENTION

The foregoing problems, as well as others not specifically mentioned, are overcome according to the teachings of the present invention, which provides a universal electrode holder wherein a single fluid supply hook-up suffices for substantially all types and sizes of electrodes.

Further, the electrode holder of the present invention permits the mounting of either long, planar surfaced electrodes or shankless plate or disc-type electrodes without necessitating any changes in the fluid supply thereto or the fitting of the individual electrode with fluid couplings.

According to the present invention, the electrodes may be either side or bottom mounted to the holder body with assurance that repeatable and precise positioning is accomplished without any adjustments in the event an electrode has to be replaced with a substitute, due to wear or the like.

Essentially, then, the universal electrode holder of the present invention comprises: a holder body having at least one sidewall, which is stepped to define a vertically disposed lower portion and vertically disposed upper portion arranged outwardly of the lower portion and integrally connected thereto by a substantially horizontally disposed connecting portion; a reference or abutment plate fixed to an end wall of the holder and having a reference surface disposed normal to said one side wall; an indexing plate movable fixed for surface to surface engagement with the lower and connecting portions for selectively positioning an end indexing surface thereof in an adjustable spaced relationship relative to the reference surface; clamp means selectively securable in a plurality of predetermined positions along the upper portion for rigidly clamping an electrode to the holder body while positionally located by surface engagement with the indexing and reference surfaces and the connecting and lower portions; and conduit means defined by the holder body and by cooperation of the lower portion and indexing plate for supplying dielectric fluid to the electrode when the same is clamped to the holder body.

The present invention also contemplates the provision of registration means on a bottom face of the electrode holder body, which includes at least two ribs depending from the bottom face and having intersecting longitudinal axes; the ribs being structured for alignment and engagement with complementary structure on a shankless electrode, whereby the same may be precisely positioned and secured to the bottom face. The conduit means defined by the holder body may additionally provide a supply of dielectric fluid to the shankless electrode.

In accordance with the present invention, means provided on the top face of the electrode holder body facilitate mounting thereof in alignment with complementary structure on the mounting head of an EDM device, and if desired, to place the conduit means of the holder body in flow communication with a source of dielectric fluid. Alternately, the mounting head of the EDM device may be fitted with a side mounted fluid supply block having a supply passage adapted to be automatically aligned with the conduit means of the holder body incident to mounting thereof on the mounting head.

Other features and advantages of the present invention will become readily apparent as a detailed description thereof proceeds.

BRIEF DESCRIPTION OF THE DRAWINGS

For a fuller understanding of the present invention reference should now be had to the following detailed description thereof taken in conjunction with the accompanying drawings, wherein:

FIG. 1 is a front elevational view of the electrode holder of the invention depicting an electrode bottom mounted thereto;

FIG. 2 is a view of the electrode holder similar to FIG. 1, but depicting an electrode mounted to a sidewall thereof;

FIG. 3 is a side elevational view of the electrode holder of FIG. 2 looking in the direction of line 3—3 thereof;

FIG. 4 is a bottom view of the electrode holder looking in the direction of line 4—4 of FIG. 1;

FIG. 5 is a plan view of an electrode mounted to the bottom face of the electrode holder looking in the direction of line 5—5 of FIG. 1;

FIG. 6 is a bottom view of the electrode depicted in FIG. 5;

FIG. 7 is a fragmentary sectional view depicting the electrode holder mounted to the head of an EDM device; and FIG. 8 is a fragmentary view of an alternate form of means to facilitate the mounting and alignment of the electrode holder to an EDM device or the like.

DESCRIPTION OF THE PREFERRED EMBODIMENT

Referring in detail to the drawings, the electrode holder according to the present invention includes a body 10 of general block form and having a top face 12, a bottom face 14, a pair of sidewalls 16 and 18 and a pair of end walls 20 and 22. Sidewalls 16 and 18 are substantially perpendicularly disposed with respect to end walls 20 and 22 and with respect to faces 12 and 14. At least sidewall 16 is stepped to define a vertically disposed lower surface portion 24, a vertically disposed upper surface portion 26 arranged relatively outwardly of or to overlie lower surface portion 24, and a substantially horizontally disposed connecting surface portion 28 integrally joined in a right angular relationship to surface portions 24 and 26.

By now referring particularly to FIGS. 2 and 3, it will be understood that reference and indexing means are operably associated with holder body 10 for the purpose of positionally locating a first type of electrode E of rectangular cross-section adjacent side wall 16 in engagement with lower and connecting surface portions 24 and 28. Specifically, the reference means is best shown in FIGS. 1-4 as including a reference or abutment plate 30 removably secured to end wall 22 by means of a threaded fastener device 32 received in an appropriately located one of a plurality of threaded apertures 22a opening through the surface of end wall 22. In the illustrated construction, reference plate 30 is provided with a reference or abutment surface 30a, which is clamped against the surface of end wall 22 and arranged to project transversly of lower and connecting portions 24 and 28.

It will be understood that the illustrated reference plate 30 may be replaced with any suitably constructed extension member, as required to locate surface 30a in an outwardly spaced relationship relative to the surface of end wall 22 in order to accommodate for mounting of an electrode having a substantially greater widthwise dimension than that illustrated in FIG. 2.

Now referring particularly to FIGS. 1, 2 and 4, it will be understood that the above mentioned indexing means is preferably in the form of an elongated, indexing plate 34 of rectangular cross-section, which is provided with an indexing or end surface 34a intended to be disposed in a parallel relationship to reference surface 30a, and rear side and upper edge surfaces 34b and 34c intended to be disposed in surface to surface sliding engagement with lower and connecting surface portions 24 and 28, respectively. Preferably, the outwardly facing side surface 34d and the lower edge surface 34e of plate 34 are disposed to lie essentially flush with or slightly inwardly of upper surface portion 26 and bottom face 14, respectively. Indexing plate 34 is formed with a pair of slots 36, which extend lengthwise of the plate in an essentially parallel relationship to each other and edge surfaces 34c and 34e, and which are positioned for alignment with a pair of parallel rows of threaded apertures 38 opening through lower surface portion 24. Slots 36 and apertures 38 are sized to receive fastener devices 40, which serve to selectively and releasably retain indexing plate 30 in a desired adjusted position determined by the widthwise dimension of electrode E to be secured to holder body 10. For instances where an electrode to be mounted has a substantial widthwise dimension, which for example can not be accommodated for by the fixing of an extension member to end wall 22 in the manner mentioned above, it is contemplated that a suitable fixture be mounted on end wall 20, as by fastener devices received within threaded apertures similar to those provided for end wall 22, for the purpose of extending lower and connecting surface portions 24 and 28, as required to support and increase the range of sliding movements of plate 34.

Preferably, holder body surface portions 24 and 28 and indexing plate surfaces 34b and 34c are suitably polished and/or machined to provide for intimate, surface to surface sliding engagement of the indexing plate with the holder body, as well as intimate surface to surface abutting engagement of such holder surface portions with the upper end and rear side surfaces of electrode E. In like manner, reference surface 30a and indexing surface 34a are preferably polished and/or machined, so as to permit intimate, surface to surface abutting engagement thereof with parallel edge surfaces of electrode E in the manner shown in FIG. 2.

By again referring to FIGS. 2 and 3, it will be understood that suitable clamping means is provided for securing side mounted electrode E in place between reference plate 30 and indexing plate 34 and in engagement with holder sidewall portions 24 and 28. Such means preferably includes a clamp arm 42 selectively securable to holder body 10 by a threaded fastener 44 sized to loosely extend through an elongated arm slot 42a for receipt within a selected one of a plurality of threaded apertures 26a, which open through upper surface portion 26 and are spaced apart lengthwise thereof. Clamp arm 42 includes, when in its operative position shown in FIG. 2, a lower end section 42b adapted to be arranged in a facing relationship with lower surface portion 24 for surface bearing engagement with the outwardly facing or front side surface of electrode E, as viewed in FIGS. 2 and 3, and an upper end section 42c, which is threaded to receive a clamping or adjustment screw device 46 arranged to have its inner end bear against upper surface portion 26. As will be apparent, adjustments of screw devices 44 and 46 serve to displace and/or tilt arm 42 as required to accommodate for the mounting of electrodes of varying thickness, whereas threaded apertures 26a permit placement of the clamp arm at various positions lengthwise of upper surface portion 26, as required to appxoximately center the clamp arm relative to electrodes of varying widthwise dimensions.

By the provision of cooperating surfaces 24, 28, 30a and 34, a precise reference orientation is provided for permitting replacement of one electrode with an identically sized electrode, without necessitating any adjustment of parts other than adjustment of screw devices 44 and/or 46, as required for electrode unclamping/clamping purposes. Further, it will be appreciated that surfaces 24, 28 and 30a cooperate to provide an accurately defined reference for use in mounting electrodes of varying size relative to holder body 10.

The universal electrode holder of the present invention also provides a bottom mounting support for a second type of electrode shown as a plate type electrode E′, which obviates the prior requirement that the upper surface 50 of such electrode be fitted with a separately fabricated or integrally formed shank for electrode support and orientation purposes. Specifically, holder body 10 is provided with registration means, such as may be defined for example by four ribs 60, 62, 64 and 66 arranged to depend from holder bottom face 14; and electrode mounting means, such as may be defined by apertures 68 having lower ends opening through holder bottom face 14 and upper ends communicating with access cavities 70 and 72, which in turn open through holder body side walls 20 and 22, respectively.

As best shown in FIG. 5, shankless upper surface 50 of electrode E′, as fabricated for use with the present holder, is provided with a pair of intersecting channels 74 and 76, which are complementary to and sized to receive ribs 60, 62 and 64, 66, respectively, with the ribs preferably bottoming out within their respective channels and surface 50 disposed in intimate surface to surface engagement with bottom surface 14. Preferably, electrode E' would be provided with threaded openings 78 disposed for alignment with apertures 68 in order to permit threaded fastener devices 80 to be inserted within the cavities 70 and 72 and passed downwardly through apertures 68 for receipt within such threaded openings for electrode mounting purposes. It is, however, specifically contemplated that apertures 68 may be threaded and openings 78 formed as bore openings, such as to permit threaded devices, not shown, to be passed upwardly through electrode E' for mounting purposes.

In the case of an EDM or similar apparatus, a dielectric fluid must be supplied to the working face or faces of electrodes mounted on holder body 10. It is, therefore, a further feature of the present invention that holder body 10 incorporates conduit means for supplying dielectric fluid to the electrodes, regardless of the size of such electrodes and whether same are mounted to depend from the side or bottom of the holder body. To this end, holder body 10 is provided with a vertically extending through passageway 90 having its upper and lower ends 90a and 90b threaded to removably receive fluid flow blocking plugs, not shown, and arranged to open centrally of holder top and bottom faces 12 and 14, respectively. As best shown in FIG. 7, passageway 90 is disposed in flow communication with the inner ends of side passageways 92 and 94, which in turn open outwardly through said wall 18 and lower surface portion 24, respectively, and have their respective outer ends 92a and 94a threaded to removably receive fluid flow blocking plugs, also not shown.

Now referring to FIGS. 1, 3 and 7, it will be noted that the outer end of passageway 94 opens centrally of a channel recess 96, which extends lengthwise of lower surface portion 24 with its opposite ends arranged slightly inwardly of end walls 20 and 22. It will also be noted that electrode E is provided with a passageway 98 for conveying dielectric fluid to its working or lower end, not shown, and that such passageway is provided with an inlet end 98a, which is arranged to open through its rear side surface for alignment with channel recess 96, when the electrode is clamped in mounted position, as best shown in FIGS. 2 and 3. As will be apparent, when indexing plate 34 and electrode E are positioned and clamped to holder body 10, as best shown in FIG. 2, the planar rear side surface 34b of the indexing plate and the planar rear side surface of the electrode cooperate with lower surface portion 24 to provide a flow passageway extending along channel 96 for directing dielectric fluid between side passageway 94 and electrode passageway inlet end 98a for all adjusted positions of the indexing plate, as determined by the length of slots 36 and the placement of threaded apertures 38. When it is desired to supply dielectric fluid to side mounted electrode E, the lower end 90b of passageway 90 is normally suitably plugged, and the outer end of said passageway 92 or the upper end 90a of passageway 90 connected to a suitable source of dielectric fluid, depending upon the type and design of machine with which the present invention is employed, and the other of such outer or upper ends fitted with an appropriate plug, as in the case of lower end of passageway 90, to prevent the loss of dielectric fluid.

Again referring to FIGS. 4 and 5, it will be noted that relatively inner ends of ribs 60, 62, 64 and 66 are spaced radially from passageway 90, and that fluid distributing channels 100 are provided in electrode upper surface 50 and arranged such that their inner ends 100a communicate with channels 74 and 76 adjacent their juncture and relatively inwardly of ribs 60, 62, 64 and 66. The outer ends 96b of channels 100 communicate with desired numbers of dielectric fluid distributing orifices 102, which extend through electrode E' and are arranged in a pattern determined by the configuration of the contoured working or lower face 50' of electrode E', and thus the desired distribution of dielectric fluid across such face. It will be understood that when electrode E' is clamped to holder body 10, their facing or engaging surfaces, cooperate to provide fluid flow passages, whose inner ends communicate with passageway 90 and whose outer ends communicate with orifices 102. If desired, the center of electrode E' may be provided with an additional orifice 98' disposed in alignment for flow communication with passageway 90. When it is desired to supply dielectric fluid to a bottom mounted electrode E', the outer end of side passageway 94 would normally be suitably plugged, and the outer end of said passageway 92 or the upper end of passageway 90 connected to a suitable source of dielectric fluid, depending upon the type and design of machine with which the present invention is employed, and the other of such outer or upper ends fitted with an appropriate plug, as in the case of said passageway 94, to prevent the loss of dielectric fluid.

Any suitable means may be provided on top face 12 of holder body 10 to facilitate the alignment and mounting thereof relative to the head of an EDM apparatus or the like, which is shown for purposes of reference and designated as H in FIG. 7. one form of such means is illustrated, as by way of example, in FIGS. 1, 2, 3 and 7 as comprising a pair of concentrically arranged circular projections 120 and 122, which extend upwardly in stepped fashion from top face 12. Projections 120 and 122 may be formed integrally with holder body 10 and adapted for insertion within a complementary formed recess 124 provided in head H for abutting engagement therewith. Holder body 10 may be fixedly secured to head H in any suitable fashion, such as by clamps or by threaded fastener devices received for instance within threaded apertures 12a provided in top face 12. Another type of holder body alignment and mounting means is shown in FIG. 8 as being in the form of a shank 122' of rectangular cross section, which may, if desired, be provided with a through bore opening communicating with passageway 90.

The provision of upwardly opening passageway 90, and the extension thereof mentioned in connection with the construction of FIG. 8, enables the conduit means of holder body 10 to be placed in direct flow communication with a suitable source of dielectric fluid for those instances when the mounting head of EDM apparatus is formed with a supply passageway. However, not all mounting heads of commercially available EDM apparatus are provided with a suitable fluid supply passageway, and this is particularly true of apparatus of the type permitting programmable, automatic replacement of a plurality of electrodes on a common mounting head. In these prior constructions, it is necessary for each electrode to be attached to a flexible supply conduit leading to a supply manifold or alternatively, for a workman to couple/uncouple a single supply conduit to each electrode as it is placed/removed from association with a common mounting head. Therefore, it is an important feature of the present invention to provide an arrangement, wherein fluid distributor means is permanently fixed to the mounting head of an EDM machine and automatically coupled in flow communication with the holder body of the present invention as an incident to its placement in mounted association with the mounting head. Specifically, the present invention contemplates that the fluid distributor means be in the form of a fluid distributor block 126, which is suitably secured to head H by a bolt 128 or the like and provided with an internal passageway 130 having an inlet end placed in flow communication, via a suitable fitting 132, with a source of dielectric fluid and a discharge end 134 disposed for alignment with side passageway 92 of holder body 10. An O-ring or the like 136 is preferably provided on block 126 in surrounding relation to discharge end 134 for providing fluid sealing engagement of holder body side wall 18 with the distributor block. With this construction, a suitable flow control valve, would be employed to control the flow of fluid between the source and the distributor block, such that the flow fluid is automatically interrupted during an automatic electrode changing operation effected by removably placing successive holder bodies and their associated electrodes in mounted association with head H.

Although certain preferred embodiments of the present invention have been disclosed and described in detail, various changes will obviously occur to those skilled in the art, and therefore it is intended that the present invention be limited only by the scope of the appended claims.

What is claimed is:

1. An electrode holder, comprising:
    a holder body having at least one sidewall stepped to define vertically disposed upper and lower surface portions connected by a horizontally disposed connecting surface portion;
    reference means mounted on said holder body and having a reference surface arranged to extend transversely of said lower and connecting surface portions relatively adjacent one end thereof;
    indexing means having an indexing surface, said indexing means being mounted on said holder body in surface engagement with said lower and connecting surface portions and for sliding movements lengthwise thereof to selectively vary the distance between said reference and indexing surfaces;
    clamping means mounted on said holder body for clamping an electrode of rectangular cross-section in a mounted position, wherein opposite edge surfaces of said electrode engage with said reference and indexing surfaces, rear side and upper surfaces of said electrode engage with said lower and connection surfaces and a front side surface of said electrode engages with said clamping means; and
    conduit means defined by said holder body and by cooperation of said lower surface portion and said indexing means for supplying fluid to said electrode when in said mounted position.

2. The electrode holder according to claim 1, wherein said clamping means is fixed to said upper surface portion selectively at points spaced apart lengthwise thereof and sized to extend downwardly therefrom for clamping engagement with said front side surface of said electrode when in said mounted position.

3. The electrode holder according to claim 2, wherein said clamping means includes a clamp arm having upper and lower end portions, a through slot opening extending between said end portions and a threaded opening extending through said upper end portion, a plurality of threaded mounting apertures opening through said upper surface portion and located one at each of said points, a threaded fastener device loosely extending through said slot in said clamp arm for receipt selectively in said mounting apertures and an adjustment threaded fastener device threadedly received within said threaded opening for end bearing engagement with said upper surface portion, thereby to effect tilting of said clamp arm about a coupling defined by said slot and said threaded fastener device for positioning said lower end portion in bearing engagement with said electrode.

4. The electrode holder according to claim 1, 2 or 3, wherein said lower surface portion is provided with at least one row of threaded openings spaced apart in a direction extending lengthwise thereof;
    said indexing means includes a plate of rectangular cross-section, said plate having rear side and upper edge surfaces arranged to slideably engage with said lower and connecting surface portions, respectively, an end surface disposed normal to said rear side and edge surfaces and defining said indexing surface, and at least one through slot opening disposed for alignment with said row of threaded openings when said rear side and upper edge surfaces of said plate are disposed in engagement with said lower and connecting surface portions, and a threaded fastener device extending through said slot opening of said plate and received within a selected one of the threaded openings of said row for releaseably clamping said plate to said holder body, while selectively permitting adjustments of said plate relative thereto for varying the distance between said reference and indexing surfaces.

5. The electrode holder according to claim 1, wherein said conduit means includes a channel formed in said lower portion adjacent said row of openings and passageway means extending through said body and having one end thereof disposed in fluid flow communication with said channel, and
    said indexing means includes a plate engaged with said lower surface portion outwardly of said channel to close portions of said channel not in alignment with said rear side surface of said electrode when in said mounted position.

6. The electrode holder according to claim 5, wherein said holder body includes a bottom face substantially perpendicularly disposed with respect to said lower surface portion, and
    registration means depending from said bottom face for removable engagement with complementary structure defined by an upper surface of a shankless bottom mounted electrode whereby the same may be precisely positioned and secured to said bottom face.

7. The electrode holder according to claim 6, wherein said conduit means further includes an additional passageway means communicating with said passageway means and having an end thereof opening through said bottom face for communication with an internal passage means opening through said upper surface of the last said electrode when the same is secured to said bottom face.

8. The electrode holder according to claim 7, wherein said registration means includes at least two ribs depending from said bottom face and having intersecting longitudinal axes.

9. The electrode holder according to claim 7, wherein said registration means includes a first pair of spaced ribs depending from said bottom face having a common longitudinal axis and a second pair of spaced ribs depending from said bottom face having a common longitudinal axis, said first pair of ribs being substantially perpendicularly oriented with respect to said second pair of ribs, said one end of said additional passageway means opens centrally of said bottom face, and relatively inner ends of said first and second pair of ribs are spaced radially outwardly of said one end of said additional passageway means.

10. A holder for selectively mounting a first type of electrode characterized as being of generally rectangular cross-section to depend from adjacent a side surface thereof and a second type of electrode characterized as having an upper surface to depend from adjacent a bottom face thereof, said holder comprising:
 a holder body having a top face, said bottom face, opposite side surfaces, including said side surface, and opposite end surfaces, said side surface being stepped to define a vertically extending upper surface portion, a vertically extending lower surface portion disposed relatively inwardly of said upper surface portion and a horizontally extending connecting surface portion extending between said upper and lower surface portions;
 reference means fixed to one of said end surfaces defining a reference surface disposed to extend transversely and outwardly of said lower and connecting surface portions;
 indexing means having rear side and upper edge surfaces arranged to slidably engage with said lower and connecting surface portions, respectively, and an indexing surface disposed parallel to said reference surface;
 means to releasably clamp said indexing means to said holder body in adjusted positions lengthwise of said lower and connecting surface portions to selectively position said indexing surface at a desired distance from said reference surface, as determined by a widthwise dimension of said first electrode, as measured between opposite edge surfaces thereof, when in a mounted position depending from adjacent said side surface with a rear side and upper end surface thereof disposed in abutting engagement with said lower and connecting surface portions, respectively, and said opposite edge surfaces disposed in abutting engagement with said reference and indexing surfaces;
 clamping means carried by said holder body for engagement with a front side surface of said first electrode for releasably retaining said first electrode in said mounted position thereof;
 registration means for positionally locating said second electrode in a mounted position with said upper surface thereof disposed in surface to surface engagement with said bottom face; and
 means for releasably retaining said second electrode in said mounted position thereof.

11. A holder according to claim 10, wherein conduit means are provided for selectively supplying dielectric fluid to said electrodes, said conduit means including passageway means within said holder body having at least one inlet for connection with a supply of dielectric fluid, an outlet opening through said lower surface portion and another outlet opening through said bottom face, said outlet and said other outlet being threaded to selectively receive means for effecting closure thereof, said lower surface portion is formed with a recess extending lengthwise thereof and arranged for flow communication with said outlet opening, said first electrode is further characterized as having a dielectric fluid distribution passageway formed with an inlet opening through said rear side surface thereof and arranged for alignment with said recess when said first electrode is in said mounted position thereof, said indexing means and said first electrode when in said mounted position thereof cooperating with said recess to define a passage for placing said outlet in flow communication with said inlet of said distribution passageway, said second electrode is further characterized as having distributing orifice means extending therethrough between said upper surface and a working face thereof, and said upper surface is configured for engagement with said bottom face for placing said orifice means in flow communication with said other outlet.

12. A holder according to claim 10, wherein said means for releasably retaining said second electrode includes at least one mounting aperture opening through said bottom face for removably receiving an electrode fastener device, wherein an upper end of said mounting aperture is made accessible by a cavity opening through one of said end surfaces of said holder body, and said second electrode is further characterized as having at least one mounting aperture opening through said upper surface thereof for receiving said electrode fastener device and disposed for alignment with the first said mounting aperture when said second electrode is in said mounted position thereof.

13. The combination of an electrode and a holder for use in mounting of said electrode on a mounting head of an electrical discharge machine device and for connecting said electrode with a source of dielectric fluid, comprising:
 said holder having a top face configured for attachment to said mounting head, a bottom face for mounting said electrode, fluid passageway means having an inlet end for attachment with said source and an outlet end opening through said bottom face, and electrode registration means depending from said bottom face;
 said electrode having a working face, an upper surface and fluid orifice means extending between said working face and said upper surface, said upper surface having recess means for receiving said registration means for positively locating said upper surface relative to said bottom face, and said upper surface, said bottom face, said registration means and said recess means cooperating to define fluid passageway means for placing said orifice means in flow communication with said outlet end; and
 means for removably attaching said electrode to said holder to place said upper surface in engagement with said bottom face.

14. A holder for use in selectively and removably mounting two types of electrodes on a mounting head of an electrical discharge machine device and for flow communication with a source of dielectric fluid having a supply outlet positionally fixed relative to said mounting head, a first of said types of said electrode having a side surface and distributing passageway means opening through said side surface, and a second of said types of said electrodes having an upper surface and distributing passageway means opening through said upper surface, comprising in combination:

said holder includes a holder body having a top face configured for removable attachment to said mounting head, opposite side faces, opposite end faces, a bottom face and fluid passageway means having an inlet end disposed for flow communication with said supply outlet incident to attachment of said top face to said mounting head, an outlet end opening through one of said side faces and an other outlet end opening through said bottom face, said outlet and other outlet ends being threaded for removably receiving means for blocking flow of fluid therethrough;

means for selectively and removably mounting said first of said types of electrodes to depend from said holder with said side surface arranged in engagement with said one of said side faces and with said distributing passageway means in flow communication with said outlet end; and means for selectively and removably mounting said second type of said electrodes to depend from said holder with said upper surface arranged in engagement with said bottom face and with said distributing orifice means in flow communication with said other outlet end.

15. The combination according to claim 14, wherein said fluid passageway means includes a main passage extending vertically within said holder body and having upper and lower ends opening through said top and bottom faces, respectively, a branch passage communicating with said main passage and having an outlet defining said outlet end and an other branch passage communicating with said main passage and having an outlet opening through the other of said side faces, said lower end defining said other outlet, end one of upper end and said outlet of said other branch passage defining said inlet end of said passageway means, and said upper and lower ends and said outlets of said branch and other branch passages are threaded for selectively and removably receiving means for blocking flow of fluid therethrough.

16. The combination according to claim 14, wherein said inlet end of said passageway means opens through the other of said side faces, said source includes a distributor block fixed to said mounting head, said block having a through passageway formed within an inlet for receiving dielectric fluid and an outlet disposed for alignment with said inlet end when said top face is attached to said mounting head, and means are provided to seal said other of said side faces to said block peripherally of said inlet end and said outlet when disposed in alignment.

17. The combination according to claim 13, wherein said outlet end is located centrally of said bottom face, said registration means includes a first pair of spaced ribs having a common longitudinal axis and a second pair of spaced ribs having a common longitudinal axis arranged substantially perpendicular to the first said longitudinal axis, said ribs having relatively inner ends thereof spaced radially outwardly of said outlet end, said recess means includes a pair of intersecting channels complementary to and sized to receive said ribs with said ribs bottoming out within their respective channels when said bottom face and upper surface are in surface to surface engagement, and said orifice means includes at least one orifice disposed radially outwardly of said outlet end.

18. The combination of an electrode, a holder for mounting said electrode on a mounting head of an electrical discharge machine device and a distributor block fixed to said mounting head for connecting said electrode with a source of dielectric fluid;

said holder includes a holder body having a top face configured for attachment to said mounting head, a bottom face for mounting said electrode, a side surface, fluid passageway means having an inlet end opening through said side surface and an outlet end opening through said bottom face, and electrode registration means depending from said bottom face;

said block has a through passageway formed with an inlet for receiving dielectric fluid and an outlet disposed for alignment with said inlet end when said top face is attached to said mounting head, and sealing means for sealing said side surface relative to said block peripherally of said outlet and inlet ends when disposed in alignment;

said electrode has a working face, an upper surface and fluid orifice means extending between said working face and said upper surface, said upper surface having recess means for receiving said registration means for positively locating said electrode relative to said holder body, said upper surface and said bottom face cooperating to define fluid passageway means for placing said orifice means in flow communication with said outlet end; and means for removably attaching said electrode to said holder body.

19. The combination of an electrode and a holder for mounting said electrode on a mounting head of an electric discharge machine and for connecting said electrode in flow communication with a source of dielectric fluid, the improvement comprising:

said holder having a face configured for attachment to said mounting head, a bottom face and a fluid passageway having an inlet end for attachment to said source and an outlet end opening through said bottom face, said electrode having an upper surface, a working face and fluid orifice means extending between said upper surface and said working face, said bottom face and said upper surface having means for precisely and repeatedly locating said upper surface relative to said bottom face, the last said means cooperating with said bottom face and said upper surface to define fluid passageway means for placing said orifice means in flow communication with said outlet end, and means for removably attaching said electrode to said holder with said upper surface in engagement with said bottom face.

20. The combination according to claim 19, wherein said last said means includes rib means carried by one of said holder and said electrode and recess means formed in the other of said holder and said electrode.

21. The combination according to claim 20, wherein said recess means includes two intersecting channels, said rib means includes two pairs of ribs received one pair within each of said channels with the inner ends of said ribs spaced outwardly of the intersection of said channels, and said intersection of said channels is located in flow communication with said outlet end.

22. The combination according to claim 21, wherein said outlet end is located centrally of said bottom face, said ribs are carried by said holder, and said ribs extend radially outwardly of said outlet end.

* * * * *

UNITED STATES PATENT AND TRADEMARK OFFICE
CERTIFICATE OF CORRECTION

PATENT NO. : 4,395,613
DATED : July 26, 1983
INVENTOR(S) : James L. Barr and Donald R. Johnson It is certified that error appears in the above-identified patent and that said Letters Patent are hereby corrected as shown below:

Col. 3, line 23 - "transversly" should be --- transversely ---.

Col. 5, line 31 - "said" should be --- side ---.

Col. 5, line 60 - "said" should be --- side ---.

Col. 6, line 22 - "said" should be --- side ---.

Col. 6, line 28 - "said" should be --- side ---.

Claim 15 - Col. 11, line 34 - "outlet, end" should be --- outlet end, ---.

Signed and Sealed this

Tenth Day of January 1984

[SEAL]

Attest:

GERALD J. MOSSINGHOFF

Attesting Officer   Commissioner of Patents and Trademarks